United States Patent [19]

Yamamoto et al.

[11] Patent Number: 5,478,902
[45] Date of Patent: Dec. 26, 1995

[54] FLUORINE-CONTAINING COPOLYMER AND COMPOSITION CONTAINING THE SAME

[75] Inventors: Yuichi Yamamoto, Takahagi; Haruyoshi Tatsu, Hitachi, both of Japan

[73] Assignee: Nippon Mektron, Limited, Tokyo, Japan

[21] Appl. No.: 318,936

[22] Filed: Oct. 6, 1994

[30] Foreign Application Priority Data

Feb. 8, 1994 [JP] Japan ................. 6-035313

[51] Int. Cl.⁶ ............. C08F 16/24; C08F 116/12
[52] U.S. Cl. ............. 526/247; 526/216; 525/326.3; 525/384
[58] Field of Search ............. 526/247, 216; 525/326.3, 384

[56] References Cited

U.S. PATENT DOCUMENTS

| | | | |
|---|---|---|---|
| 3,350,373 | 10/1967 | Sianesi et al. | 526/216 |
| 4,489,196 | 12/1984 | Schmiegel | 525/326.3 |
| 4,882,390 | 11/1989 | Grootaert et al. | 525/326.3 |
| 4,957,975 | 9/1990 | Carlson et al. | 525/326.3 |
| 5,227,441 | 7/1993 | Kruger et al. | |

FOREIGN PATENT DOCUMENTS

| | | | |
|---|---|---|---|
| 0219065 | 4/1987 | European Pat. Off. | 526/247 |
| 5679142 | 6/1981 | Japan | 525/326.3 |
| 60-44511 | 3/1985 | Japan. | |

*Primary Examiner*—Joseph L. Schofer
*Assistant Examiner*—N. Sarofin
*Attorney, Agent, or Firm*—Lowe, Price, LeBlanc & Becker

[57] ABSTRACT

A fluorine-containing-copolymer composition comprises a novel terpolymer of tetrafluoroethylene-perfluoro (methylvinylether)-1,1,3,3,3-pentafluoropropene and dialkali metal salt of bisphenol compound gives a vulcanization product having a low compression set.

4 Claims, No Drawings

FLUORINE-CONTAINING COPOLYMER AND COMPOSITION CONTAINING THE SAME

BACKGROUND OF THE INVENTION

1. Field of the Invention

The present invention relates to a fluorine-containing copolymer and a composition containing tha same, and more particularly to a novel fluorine-containing copolymer and a composition containing the same, the, composition being capable of producing a vulcanization product having a low compression set.

2. Description of the Prior Art

Copolymers of tetrafluoroethylene and perfluoro(methylvinylether) are completely fluorinated and thus have a good resistance to chemicals, whereas it is necessary to introduce a compound capable of forming a peroxide-vulcanizable, cross-linkable site in the copolymers because the copolymers have no cross-linkable sites. The compound capable of forming a peroxide-vulcanizable, cross-linkable site includes, for example, an iodine-containing compound, a bromine-containing compound, a cyano group-containing unsaturated compound, a phenoxy group-containing unsaturated compound,. etc.

JP-A-80-44511 discloses that tetrafluoroethyleneperfluoro(methylvinylgther) copolymers can have considerably improved cross-lining characteristics and: compression set characteristics by further copolymerizing a monomer having a cross-linkable site, represented by the general formula $R_1 CH{=}CR_2R_3$, wherein $R_1$ and $R_2$ are a hydrogen atom or a fluorine atom and $R_3$ is a hydrogen atom, a fluorine atom, an alkyl group or a perfluoroalkyl group, for example, $CH_2{=}CH_2$, $CH_2{=}CHF$, $CH_2{=}CF_2$, $CHF{=}CF_2$, $CH_2{=}CHCF_3$, $CH_2{=}CHC_4F_9$, etc., preferably trifluoroethylene or vinylidene fluoride, into the copolymers and by vulcanizing the resulting copolymers with dipotassium salt of bisphenol AF, etc.

However, as a result of extensive studies, the present inventors have been found that even if trifluoroethylene, which has been regarded as a preferable monomer capable of forming a cross-linkable site, is further copolymerized into the tetrafluoroethylene-perfluoro(methylvinylether) copolymer, followed by vulcanization with dipotassium salt of bisphenol AF, the compression set characteristics of the resulting vulcanization products fail to reach a fully satisfactory level.

SUMMARY OF THE INVENTION

An object of the present invention is to provide a novel fluorine-containing copolymer prepared by copolymerizing a monomer capable of forming a cross-linkable site in a tetrafluoroethylene-perfluoro(methylvinylether) copolymer.

Another object of the present invention is to provide a fluorine-containing copolymer composition comprising dialkali metal salt of bisphenol compound, capable of producing a vulcanization product having a low compression set.

According to a first aspect of the present invention there is provided a tetrafluoroethylene-perfluoro(methylvinylether)-1,1,3,3,3-pentafluoropropene terpolymer.

According to a second aspect of the present invention there is provided a fluorine-containing copolymer composition which comprises a tetrafluoroethylene-perfluoro(methylvinylether)-1,1,3,3,3-pentafluoropropene terpolymer and dialkali metal salt of bisphenol compound.

DETAILED DESCRIPTION OF THE INVENTION

Copolymerization of tetrafluoroethylene, perfluoro(methylvinylether)-1,1,3,3,3-pentafluoropropene can be carried out according to any desired polymerization procedure, for example, by emulsion polymerization, suspension polymerization, bulk polymerization, etc. From the viewpoint of economy, an emulsion polymerization procedure is preferable. The emulsion polymerization reaction can be carried out usually at a temperature of about 40° C. to about 85° C. under a pressure of about 3 to about 8MPa, using a water-soluble inoganic peroxide or its redox system as a catalyst and using a surfactant such as ammonium perfluorooctanoate, etc.

The terpolymer can be further copolymerized with other vinyl monomer or olefin monomer such as vinyl fluoride, vinylidene fluoride, trifluoroethylene, chlorotrifluoroethylene, perfluoro(alkyleneoxyalkylvinylether), alkylvinyl ether, vinyl acetate, vinyl chloride, ethylene, propylene, etc. in such an amount as not to disturb the objects of the present invention, usually in an amount of not more than about 20% by mole, preferably not more than about 10% by mole, on the basis of the terpolymer.

The present terpolymer usually has such a viscosity characteristic as an intrinsic viscosity $\eta sp/c$ of about 0.5 to about 5 dl/g, measured in Florinat FC-77 (an inert liquid containing perfluoro(2-butyltetrahydrofuran) as the main component, a product made by Sumitomo 3M K.K., Japan) at 35° C. and comprises about 45 to about 80% by mole, preferably about 47 to about 65% by mole, of tetrafluoroethylene, about 20 to about 50% by mole, preferably about 35 to about 50% by mole, of perfluoro(methylvinylether) and about 0.1 to about 5% by mole, preferably about 0.1 to about 3% by mole, of pentafluoropropene, determined by $^{19}F$ NMR and infrared absorption spectra, and can be subjected to vulcanization with dialkali metal salt of bisphenol compound.

Monomer ratio of tetrafluoroethylene to perfluoro(methylvinylether) in the terpolymer is common to a monomer ratio usually employed in conventional fluorine-containing copolymers of shch a kind. When a monomer ratio of pentafluoropropene copolymerized to give a cross-likable group is below about 0.1% by mole, a terpolymer capable of giving a desired compression set cannot be obtained, whereas above about 5% by mole, the workability of the resulting vulcanization product is lowered.

Vulcanization of the terpolymer can be carried out by about 0.5 to about 10 parts by weight, preferably about 1 to about 6 parts by weight of dialkali metal salt of bisphenol compound on the basis of 100 parts by weight of the terpolymer.

Dialkali metal salt of bisphenol compound includes dialkali metal salts of bisphenol A represented by the following chemical formula:

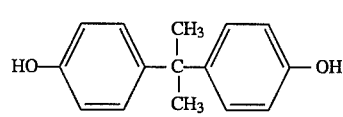

and bisphenol AF represented by the following chemical formula:

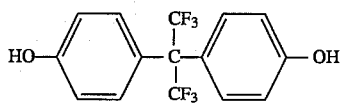

preferably disodium salt, dipotassium salt, monosodium monopotassium salt of bisphenol AF.

The present fluorine-containing copolymer composition can further contain, if required, a filler such as carbon black, etc., and an acid acceptor such as an oxide or hydroxide of divalent metal, etc. in addition to the above-mentioned essential components.

Vulcanization can be carried out by press vulcanization (primary vulcanization) at about 100° to about 250° C. for about one minute to about 2 hours and by an oven vulcanization (secondary vulcanization) at about 150° to about 300° C. for about 0 to about 30 hours. It is preferable to carry out the oven vulcanization while elevating the temperature stagewise. In that case, it is effective to use a vulcanization promoter such as dicyclohexyl-18-Crown-6, etc. to accelerate the vulcanization rate.

When a novel terpolymer obtained by further copolymerizing 1,1,3,3,3-pentafluoropropene as a monomer capable of forming a cross-linkable site into tetrafluoroethyleneperfluoro(methylvinylether) copolymer is vulcanized with dialkali metal salt of bisphenol compound, the resulting vulcanization product can have improved vulcanization characteristics and a considerably improved compression set.

PREFERRED EMBODIMENTS OF THE INVENTION

The present invention will be described in detail below, referring to Example and Comparative Example.

EXAMPLE

Into an autoclave having a net capacity of 10 liters were charged 3,660 g of water, 66 g of hexafluoroisopropanol, 11.0 g of $Na_2HPO_4 \cdot 12H_2O$, 2.2 g of NaOH and 15.4 g of ammonium perfluorooctanoate, and then the autoclave was flushed with a nitrogen gas. Then, the following compounds were charged into the autoclave:

| Tetrafluoroethylene | [TFE] | 650 g |
| Perfluoro(methylvinylether) | [FMVE] | 1850 g |
| 1,1,3,3,3-Pentafluoropropene | [5FP] | 40 g |

After the autoclave was heated to 45° C., 5.5 g of ammonium persulfate and 0.3 g of sodium hydrogen sulfite were added thereto to start -polymerization reaction. After the polymerization reaction was continued at that temperature for 17 hours, the unreacted gas was purged from the autoclave, and the polymerization reaction was completed by cooling the autoclave. The resulting aqueous latex was salted out with an aqueous 10% sodium chloride solution, washed with water and dried, whereby 1,130 g of fluorine-containing elastomer (molar ratio of TFE: FMVE: 5FP= 55.4: 44.0: 1.6; ηsp/c=2.8) was obtained as a white rubbery terpolymer.

Then, 5 parts by weight of MT carbon black, 4 parts by weight of lead oxide and 3 parts by weight of dipotassium salt of bisphenol AF were added to 100 parts by weight of the resulting fluorine-containing elastomer, and the resulting mixture was kneaded in a roll mill. The resulting kneaded product was subjected to press vulcanization at 180° C. for 10 minutes and then to oven vulcanization in the following schedule:

Heating from 100° C. to 200° C. over 4 hours,
Maintaining at 200° C. for 20 hours,
Heating from 200° C. to 280° C. over 6 hours, and
Maintaining at 280° C. for 18 hours, in total 48 hours.

The resulting vulcanization product was then subjected to determination of vulcanization physical properties (JIS K-6301) and compression set (200° C., 230° C. or 250° C. for 70 hours, respectively).

COMPARATIVE EXAMPLE

Copolymerization reaction was carried out in the same manner as in Example, except that 25 g of trifluoroethylene (3FE) was used in place of 40 g of 1,1,3,3,3-pentafluoropropene (5FP), whereby 1,090 g of fluorine-containing elastomer (molar ratio of TFE: FMVE: 3FE=59.4: 39,1: 1.5; ηsp/c=2.7) was obtained as a white rubbery terpolymer. The resulting fluorine-containing elastomer was subjected to vulcanization, and determination of vulcanization characteristics and compression set in the same manner as in Example.

Results of determinations in Example and Comparative Example are shown in the following Table:

TABLE

| Items to be determined | Example | Comp. Ex. |
| --- | --- | --- |
| Hardness (JIS A) | 80 | 80 |
| 100% Modulus (kg/cm$^2$) | 59 | 52 |
| Tensile strength(kg/cm$^2$) | 191 | 180 |
| Elongation (%) | 258 | 250 |
| Compression set | | |
| 200° C. (%) | 35 | 71 |
| 230° C. (%) | 36 | 81 |
| 250° C. (%) | 39 | 94 |

What is claimed is:

1. A fluorine-containing copolymer composition, which comprises a tetrafluoroethylene-perfluoro(methylvinylether)-1,1,3,3,3-pentafluoropropene terpolymer comprising 45 to 80% by mole of tetrafluoroethylene, 20 to 50% by mole of perfluoro(methylvinylether) and 0.1 to 0.5% by mole of 1,1,3,3,3-pentafluoropropene, and dialkali metal salt of a bisphenol compound.

2. A fluorine-containing copolymer composition according to claim 1, wherein the dialkali metal salt of the bisphenol compound is a dialkali metal salt of bisphenol A.

3. A fluorine-containing copolymer composition according to claim 1, wherein the dialkali metal salt of the bisphenol compound is a dialkali metal salt of bisphenol AF.

4. A fluorine-containing copolymer composition according to claim 1, wherein the composition includes about 0.5 to 10 parts by weight of the dialkali metal salt of the bisphenol compound on the basis of 100 parts by weight of the terpolymer.

* * * * *